Patented Jan. 27, 1942

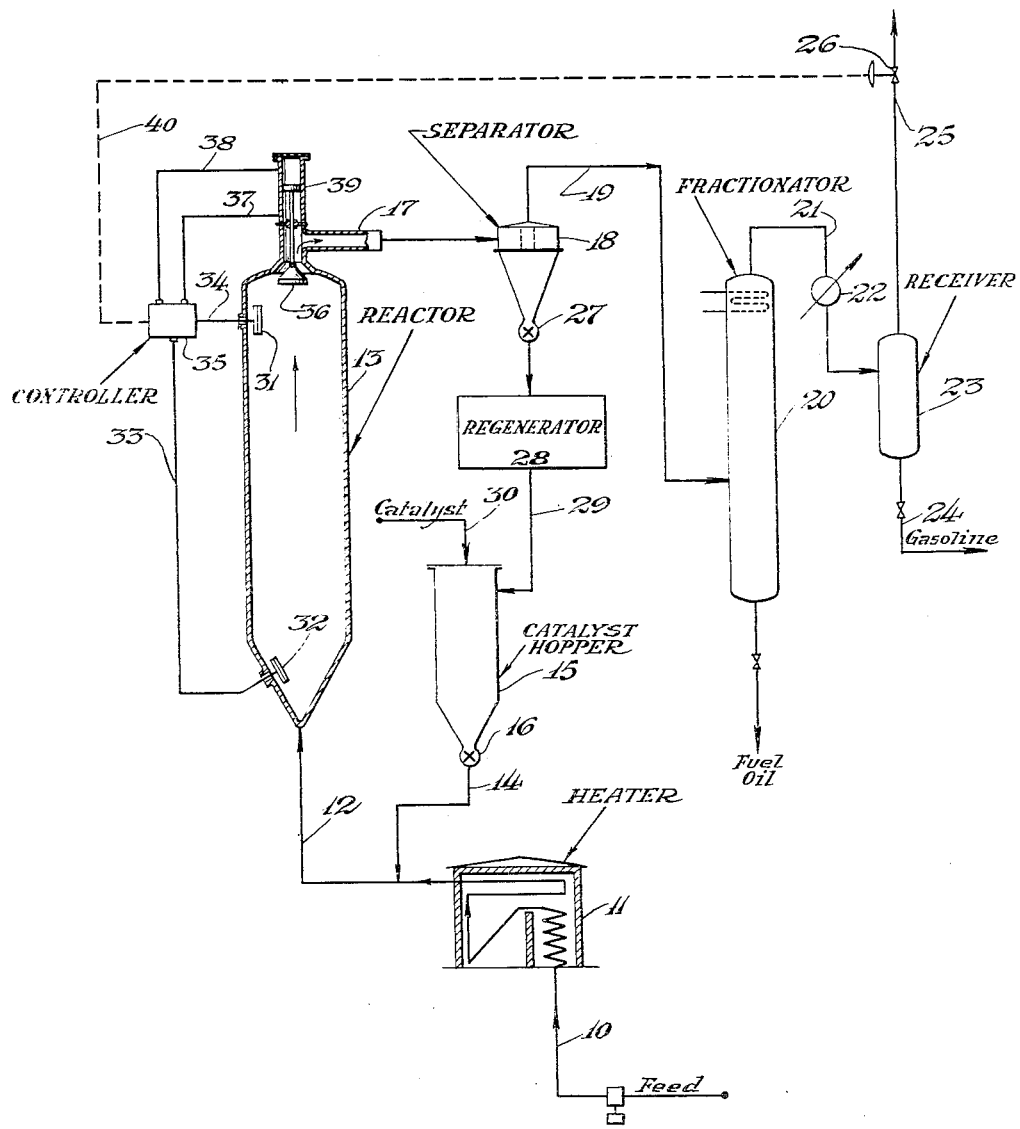

2,271,148

UNITED STATES PATENT OFFICE 2,271,148

HYDROCARBON CONVERSION WITH SUSPENDED CATALYSTS

Sam B. Becker, Chicago, and Everett A. Johnson, Park Ridge, Ill., assignors to Standard Oil Company, Chicago, Ill., a corporation of Indiana Application December 31, 1940, Serial No. 372,542

9 Claims. (Cl. 196—52)

This invention relates to the contacting of fluids with finely-divided or powdered solid materials wherein the sedimentation of the solid materials in the fluid is hindered. More particularly, the invention relates to low-velocity upflow contacting wherein a mixture of fluid and powdered solid is injected upwardly into a zone of hindered sedimentation, and wherein the ratio of solid material to the fluid is controlled as a function of the differential pressure through the contacting apparatus.

The contacting apparatus described hereinafter may be used for many purposes, for example, in effecting catalytic conversion of hydrocarbons, in coking powdered coal in a stream of hydrocarbon gases, and in the adsorption of gases and vapors by powdered solid materials.

This invention has been found to be particularly applicable to the conversion of hydrocarbons in the presence of suspended solid catalysts in the form of powder or fine granules. The invention relates more specifically to the process and apparatus for controlling the conversion of hydrocarbons by the action of suspended catalysts in a reaction vessel.

One object of the invention is to control automatically the extent of conversion of hydrocarbons such as gas oil vapors when passing through a reaction vessel filled with a suspension of powdered refractory solid catalyst. Another object of the invention is to improve the yield and knock rating of gasoline from the cracking of gas oil or the reforming of low knock rating naphthas by smoothing out the fluctuations commonly occurring in suspended catalyst operation.

Heretofore, it has been found that heavy hydrocarbons such as gas oil and vaporizable hydrocarbon oils in general may be converted into gasoline with yields of about 30 to 60% per pass by vaporizing the oils and contacting the vapors with finely-divided solid catalytic materials in suspension at temperatures within the conversion range, usually of the order of 850 to 1100° F., preferably about 925° F. to 1000° F. The catalysts employed in this process have usually been metal oxides, natural clays, fuller's earth, acid treated clays, acid treated bentonite, active silica, active silica promoted with active alumina, magnesia, zirconia and other metal oxides such as chromium oxide, molybdenum oxide and oxides of the IVth, Vth and VIth group metals, in general, including also cobalt and nickel. The catalysts most commonly employed have been activated silica, such as precipitated silica and silica gel promoted with alumina or magnesia in amounts of the order of 2 to 25% of the promoter. Acid treated bauxite and bentonite have also been employed successfully. The physical form of the catalyst in suspended catalyst conversion operations is usually a powder ranging in grade from 30 mesh to 300 mesh or finer, e. g., 400 mesh. Even coarser material has been employed and generally material falling within the range of 80 to 200 mesh is very satisfactory.

In previous operations, it has been the practice to disperse the catalyst in a hot stream of oil vapor, introducing the catalyst continuously at the desired rate, for example, a rate sufficient to give a catalyst to oil ratio of about ½ pound to 3 pounds of catalyst per pound of oil treated. The dispersion of catalyst in oil vapors at conversion temperature is conveniently conducted into the base of an elongated vertical reaction chamber in which the upflowing vapors keep the catalyst suspended and prevent its settling out of the reaction zone and out of contact with the incoming hydrocarbons.

In a system of this kind, however, the concentration of the catalyst in the vapors in the reaction zone or reactor is not the same as the concentration at which the catalyst is introduced into the vapors. Instead, the concentration of catalyst in the reactor is always higher and under certain conditions very materially higher than would be calculated from the rate at which the catalyst is introduced. In fact, there are certain conditions of low velocity in the upflowing vapors in the reactor where the concentration of catalyst in the reactor is nearly independent of the rate at which the catalyst is introduced.

This effect is caused by the phenomenon of "hindered settling," a term used to describe the increase in catalyst concentration in the reactor vapors resulting from the effect of gravity on the catalyst particles causing them to settle against the vapor stream in the reactor. Complete settling and separation of the catalyst from the vapors, however, is prevented or "hindered" by the disturbing and buoying action of the upflowing vapor stream. However, the concentration of catalyst in the reactor is not simply determinable by knowledge of the particle sedimentation rate in still gas but is largely influenced by the agitating effect of the gas flowing through the reactor causing bombardment of catalyst particles by other catalyst particles. This bombardment appears to be responsible for the fact that compaction of catalyst particles does not occur under ordinary conditions, and likewise segregation of catalyst particles is largely prevented except under certain unusual conditions.

The effect of sedimentation on catalyst concentration is exemplified by data showing that in a reaction vessel having an upflowing vapor velocity of five feet per second, where the catalyst has been introduced at the rate of one pound per cubic foot of vapor, the catalyst concentration within the reactor has been found to be about three pounds per cubic foot of reactor volume, showing a concentrating effect of threefold at this velocity. At higher velocities the concentrating effect is less and at lower velocities it is considerably more. For example, at a velocity of about one foot per second, introducing catalyst at the rate of one pound per cubic foot, resulted in a catalyst concentration within the reactor of about eleven pounds per cubic foot of reactor volume representing an increase of concentration of elevenfold.

Considerable advantage has been taken of this hindered settling phenomenon in catalytic hydrocarbon conversion because it has enabled refiners to greatly reduce the size of the reactor for a given amount of catalyst in the reaction zone. The resulting reduction in cost of equipment is a minor advantage in comparison with the conservation of heat and the maintenance of desired reaction temperatures in that part of the system where it is of paramount importance to avoid loss of heat, considering that the conversion reactions are usually endothermic, thereby resulting in an unavoidable fall in temperature, often to a point below the desired reaction range.

One of the disadvantages of the hindered settling reactor, however, is its unstable behavior in operation. A number of factors contribute to this instability, among which are variations in vapor velocity affecting catalyst concentration; variations in catalyst activity affecting rate of conversion; temperature changes affecting rate of conversion; variations in susceptibility of charging stock to cracking; unavoidable slight variations in catalyst to oil ratio; variations in product distribution leading to production of lower and higher molecular weight products with concomitant changes in the vapor volume of conversion products and resulting effect on vapor velocity. As a result of this instability, the catalyst may be carried out of the reactor in surges so that the process, instead of operating smoothly and in balance, surges from one extreme to the other with respect to catalyst poverty and catalyst plenty in the reactor.

We have found that this instability in the hindered settling reactor can be largely controlled by automatically maintaining a constant average density of material in the reactor and to this end we have devised an apparatus which accomplishes this result by changing the pressure in the reactor in response to density changes. As the pressure is increased or decreased, the vapor velocity in the reactor is decreased or increased, respectively, resulting in increasing or decreasing catalyst concentration, respectively, to compensate for unavoidable changes in operation which are beyond the control of the operator and which would normally lead to upsetting the balance in the entire system.

Our invention is illustrated by a drawing which forms a part of this specification and which shows diagrammatically an apparatus for carrying out the process. Referring to the drawing, the charging stock may be midcontinent gas oil or a Pennsylvania heavy naphtha, for example, may be introduced at line 10 and forced through heater 11 where it is vaporized and heated to the desired conversion temperature, e. g., 925° F. The hot vapors pass through transfer line 12 to the bottom of reactor 13 and on the way they receive the proper amount of catalyst which is introduced by line 14 from catalyst supply 15. The rate of introduction is controlled by a rotating valve or a screw pump or other automatic feeding device 16 to obtain the desired catalyst to oil ratio. In ordinary operations, a catalyst ratio of about two pounds of catalyst per pound of gas oil is satisfactory. It is desirable to supply the catalyst in a preheated condition to avoid undue cooling of the hot oil vapors in transfer line 12.

The vapor-catalyst dispersion flows upward through reactor 13 and passes out at the top by line 17 leading to catalyst separator 28, usually in the form of a cyclone separator which removes the catalyst from the hydrocarbon products. Separtor 18 may be supplemented by other separators not shown to obtain more complete removal of catalyst from hydrocarbon vapors.

The hot hydrocarbon vapors thence flow by line 19 to fractionator 20 where gasoline and lighter products are removed by vapor line 21 leading through condenser 22 to receiver 23 in which the gasoline is separated from uncondensable gases and is withdrawn by line 24. The gases pass off through vent line 25 controlled by valve 26.

Catalyst separated in 18 flows through pump 27 or other repressuring device to regenerator 28 which schematically represents an apparatus for effecting controlled combustion of carbonaceous material contaminating the catalysts. Regeneration may be effected by passing the catalyst in suspension through a reaction chamber or elongated pipe coil in which controlled amounts of air are introduced to burn off carbonaceous matter and leave the catalyst in substantially the same condition as it was originally. If the regeneration is carried out under proper conditions and excessive temperatures are avoided the catalyst may be recycled in the system almost indefinitely. The temperatures employed in regeneration ordinarily are about 1000° F. to 1200° F. Higher temperatures may be used with certain oxide catalysts whereas lower temperatures are sometimes required with activated natural clays, magnesia, etc.

The regenerated catalyst flows by line 29 back to catalyst supply chamber 15. Fresh catalyst may be introduced by line 30 when needed, usually to make up for unavoidable losses from the system.

After the system has been brought to equilibrium conditions, it will be found that the amount of catalyst in reactor 13 is usually from five to fifty times the amount which would be present were there no concentration due to the settling effects. When reaching equilibrium conditions in a process of this kind, it is usually desirable to establish a fixed rate of oil input and catalyst input. With these variables eliminated, control of the process is greatly simplified. Heater 11 may be adjusted to handle a fixed rate of feed and catalyst feeder 16 may likewise be set to provide a fixed catalyst-oil ratio. Under these conditions of fixed feed rate and fixed catalyst-oil ratio, reactor 13 will normally develop a maximum catalyst concentration which is ordinarily about 5 to 15 pounds of catalyst per cubic foot of reactor volume although lower concentrations, as low as 1 to 4 pounds of catalyst per cubic foot may sometimes be employed when operating at higher vapor velocities.

After the operation has reached equilibrium and the desired catalyst concentration is obtained, we prevent any sudden reduction in catalyst concentration or loss of catalyst from the reactor by automatically changing the pressure in reactor 13 in response thereto. When the pressure is increased the vapor velocity is decreased and this very rapidly results in increase in sedimentation of the catalyst to compensate for any loss.

Referring again to the drawing, this result is obtained by constantly detecting the differential pressure between the top and the bottom of the reactor by means of diaphragms 31 and 32. The difference in pressure indicated by these diaphragms is an indirect measure of the catalyst concentration or total catalyst in the reactor since the catalyst, while in suspension, behaves as a fluid and exerts a hydrostatic pressure effect on the diaphragms.

Fluid in lines 33 and 34 conveys an indication of the pressure differential between the top and bottom of the reaction chamber to the automatic controller 35. When the pressure differential falls below a desired value, outlet valve 36 is caused to be partially closed by the action of controlling fluid in lines 37 and 38 acting on the piston in the cylinder 39. The position of valve 36 is, therefore, determined indirectly by the differential pressure or "head" across reactor 13. As the head falls below the desired value, valve 36 is automatically closed sufficiently to increase the pressure and decrease the vapor velocity and to increase catalyst concentration and indirectly the density of the vapor-catalyst dispersion in 13. As a result a constant concentration of catalyst in reactor 13 may be maintained at all times thereby eliminating this important variable from the system and greatly facilitating the control of the process. One of the important factors in the conversion of hydrocarbons with catalysts is the "catalyst residence time" and in a powdered catalyst process of this type the catalyst residence time is a direct function of the catalyst concentration in the reactor when the feed rate and catalyst to oil ratio in the reactor are maintained constant. Our method of control has, therefore, provided means for controlling this important variable, the catalyst residence time, in suspended catalyst processes employing upflow reactors.

The extent of pressure change in the operation of our controller need not be very great. For example, when operating at atmospheric pressure or slightly above, e. g., 20 pounds per square inch absolute, it is only necessary to increase the pressure 20 pounds per square inch in reactor 13 to double the density of the vapors in the reactor and reduce the upward velocity to half. A reduction in the upward velocity of vapors of this magnitude is sufficient to change the catalyst concentration from three- to tenfold, depending on conditions. In order to stabilize operation according to our process, we need to employ a controlling apparatus having a range sufficient to change the absolute pressure only about two- to threefold. Hence, in normal operations with our controller, the range of pressure changes effected by the controller will commonly be only about 0.1 to 0.5 times the absolute pressure existing in the reactor. These pressure changes are usually of a very low order considering that a suspended catalyst process commonly operates at near atmospheric pressure or low superatmospheric pressures of the order of 20 to 50 pounds per square inch gauge.

Inasmuch as high pressure changes are not needed or desired in the operation of our controller, in the interest of safety, we prefer to employ an apparatus which is incapable of producing large pressure increases. One means of accomplishing this is by having the head and/or the seat of valve 36 slotted or drilled to prevent complete closure. Other means of obtaining this result will be obvious.

As an alternative to the method of pressure control just described, we may control the pressure in reactor 13 by automatically regulating the pressure on the entire vapor system, including reactor 13, separator 18, fractionator 20, and receiver 23. The pressure in regenerator 28 and catalyst supply 15 may also be included in this system if desired. To accomplish the regulation of pressure by this means dotted line 40 is shown connecting diaphragm valve 26 in vent line 25 with controller 35. By using this method of control the control valve 36 may be disconnected or omitted. The pressure on the system will then be increased or decreased in response to a decrease or increase respectively in the hydrostatic head across reactor 13 acting through detectors 31 and 32 and controller 35 partially closing or opening valve 26 through control line 40.

We have described our invention with respect to a specific application thereof but intend that it be limited only by the following claims.

We claim:
1. The method of controlling the concentration of dispersed solid material in a vertical, upflow fluid-solid contacting system which comprises automatically varying the pressure in the contacting zone in response to variations in pressure differential between the top and bottom of said contacting zone.

2. The method of controlling the concentration of catalyst in a vertical, upflow reactor of a suspended catalyst hydrocarbon conversion system which comprises automatically varying the pressure in the reactor in response to variations in pressure differential between the top and the bottom of said reactor.

3. In the conversion of hydrocarbon oils by the action of suspended powdered solid catalysts at elevated temperatures wherein a proportioned amount of said catalyst is continuously introduced and dispersed in a stream of the vapors of said oil and the resulting dispersion is conducted upwardly through an elongated, vertically disposed reaction zone after which the catalyst is separated from the hydrocarbon products, the improvement comprising regulating the time of residence of said catalyst in said reaction zone by maintaining the oil feed rate constant and varying the pressure in said reaction zone in response to the differential pressure between the top and bottom of said reaction zone.

4. In the conversion of hydrocarbon oils by the action of suspended powdered solid catalysts at elevated temperatures wherein a proportioned amount of said catalyst is continuously introduced and dispersed in a stream of the vapors of said oil and the resulting dispersion is conducted upwardly through an elongated, vertically disposed reaction zone after which the catalyst is separated from the hydrocarbon products, the improvement comprising regulating the time of residence of said catalyst in said reaction zone by maintaining the oil feed rate and catalyst feed rate constant and varying the pressure in said reaction zone in response to the differential pressure between the top and bottom of said reaction zone.

5. In the process of cracking heavy hydrocarbon oils with catalysts, wherein said oils are vaporized and heated to a high cracking temperature, a powdered solid catalyst is introduced into the stream of oil vapors, the mixture of oil vapors and powdered catalyst is passed upwardly through an elongated, vertically disposed reaction zone maintained at conversion temperature, hydrocarbon reaction product vapors and suspended catalyst are withdrawn from said reaction zone and separated and said hydrocarbon products are fractionated in the fractionating zone to produce the desired high knock rating gasoline, the improvement comprising varying the pressure on said conversion system, including said reaction zone, separating zone, and fractionating zone, in response to changes in the differential pressure between the top and bottom of said reaction zone in a manner to maintain substantially constant the average density of the mixture of catalyst and hydrocarbon vapors within said reaction zone.

6. Apparatus for contacting gases and dispersed solid catalysts suspended therein, comprising a vertically elongated reaction chamber, means for introducing said gases at the bottom of said chamber, means for introducing catalyst into said chamber, means for withdrawing dispersed catalyst and reaction products from said chamber, means for detecting differences in pressure at two vertically spaced points within said reaction chamber, and means for varying automatically the pressure within said chamber in response to changes in the pressure differential between said vertically spaced points.

7. In the process of contacting gases with finely-divided solid materials by passing a mixture of said gases and solid materials upwardly through a vertically elongated contacting zone under conditions of hindered sedimentation of said solid materials, the improvement which comprises regulating the time of residence of said solid materials in said contacting zone by maintaining the feed rate of said gases and said solid materials, respectively, at constant values and varying the pressure in said contacting zone in response to the pressure differential between the top and bottom of said contacting zone.

8. An apparatus for converting hydrocarbon oil vapors by the action of suspended powdered, solid catalysts, comprising a vertically disposed, elongated reaction chamber, means for introducing hydrocarbon vapors at the bottom of said reaction chamber, means for introducing catalyst into said reaction chamber, means for withdrawing catalyst and hydrocarbon vapors at the top of said reaction chamber, a valve in the outlet of said reaction chamber responsive to an automatic controlling device and means responsive to the difference in pressure at the top of said reaction chamber and the bottom of said reaction chamber for actuating said valve controlling device, whereby said valve is moved toward the open position when the pressure difference across said reaction chamber increases and toward the closed position when the pressure difference across said reaction chamber decreases.

9. Apparatus for contacting gases and dispersed solid material suspended therein, comprising a vertically elongated contacting chamber, means for introducing said gases at the bottom of said chamber, means for introducing dispersible solid material into said chamber, means for withdrawing dispersed solid material and gases from said chamber, means for detecting differences in pressure at two vertically spaced points within said chamber, and means varying automatically the pressure within said chamber in response to changes in the pressure differential between said vertically spaced points.

SAM B. BECKER.
EVERETT A. JOHNSON.